UNITED STATES PATENT OFFICE.

ARTHUR LÜTTRINGHAUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

VAT DYE.

1,011,068.  Specification of Letters Patent.  Patented Dec. 5, 1911.

No Drawing. Application filed February 18, 1911. Serial No. 609,344.

*To all whom it may concern:*

Be it known that I, ARTHUR LÜTTRINGHAUS, Ph. D., chemist, a subject of the King of Prussia, residing at Ludwigshafen-on-the-Rhine, Germany, have invented new and useful Improvements in Vat Dye, of which the following is a specification.

I have discovered a new vat coloring matter of the anthracene series which can be obtained by condensing 1-halogen-anthraquinone-2-carboxylic acid with beta-naphthylamin and then subjecting the product so obtained to a further condensing action, so that the elements of water are removed and ring formation takes place. The condensation can be effected, for instance, by means of thionyl chlorid, or phosphorous pentachlorid. My new coloring matter can be obtained, for example, as follows, but my invention is of course not confined to this example. The parts are by weight.

Dissolve fifty-eight parts of 1-chlor-anthraquinone-2-carboxylic acid and thirteen and three-tenths parts of calcined sodium carbonate in five hundred parts of hot water. Add thirty-three parts of beta-naphthylamin, two parts of copper powder and one hundred and thirty-five parts of calcined sodium carbonate. Boil the mixture for from three to four hours, and then, when cold, filter to remove the sodium salt of beta-naphthalido-anthraquinone-2-carboxylic acid; wash this with water and then extract it with boiling dilute hydrochloric acid. Then treat ten parts of the carboxylic acid so obtained with one hundred parts of ortho-dichlor-benzene and seventy-five parts of phosphorous pentachlorid for from one to two hours, at ordinary temperature. Then filter off the coloring matter and wash it with alcohol or acetone.

My new coloring matter is free from chlorin and consists, when dry, of a red powder. It is difficultly soluble in boiling anilin with a brownish red color, it yields a reddish yellow solution in seventy per cent. sulfuric acid, from which solution after a short time an orange precipitate separates out; it is insoluble in sixty-five per cent. sulfuric acid, and dyes cotton from the vat beautiful red shades.

The formation of my new coloring matter can be represented by the following formulæ

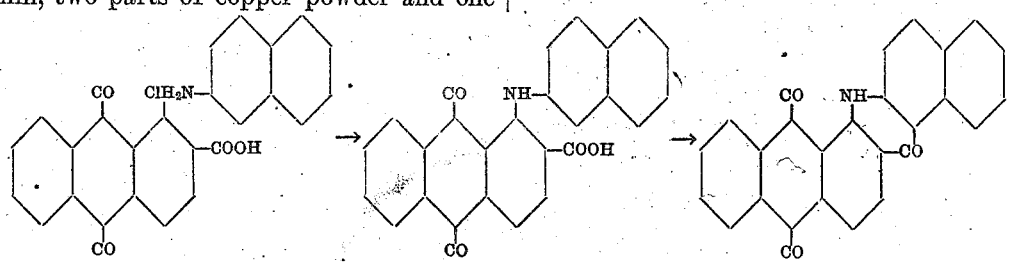

Now what I claim is:—

The new coloring matter of the anthracene series which is obtainable from 1-halogen-anthraquinone-2-carboxylic acid and beta-naphthylamin, which is an anthraquinone-naphthacridone and possesses a constitution corresponding to the formula

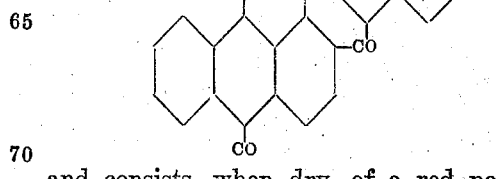

and consists, when dry, of a red powder, which is difficultly soluble in boiling anilin with a brownish red color, which yields a reddish yellow solution in seventy per cent. sulfuric acid from which solution after a short time an orange precipitate separates out, and which is insoluble in sixty-five per cent. sulfuric acid, and dyes cotton from the vat beautiful red shades.

In testimony whereof I have hereunto set my hand in the presence of two subscribing witnesses.

ARTHUR LÜTTRINGHAUS.

Witnesses:
J. ALEC. LLOYD,
A. O. TITTMANN.